Patented Dec. 3, 1929

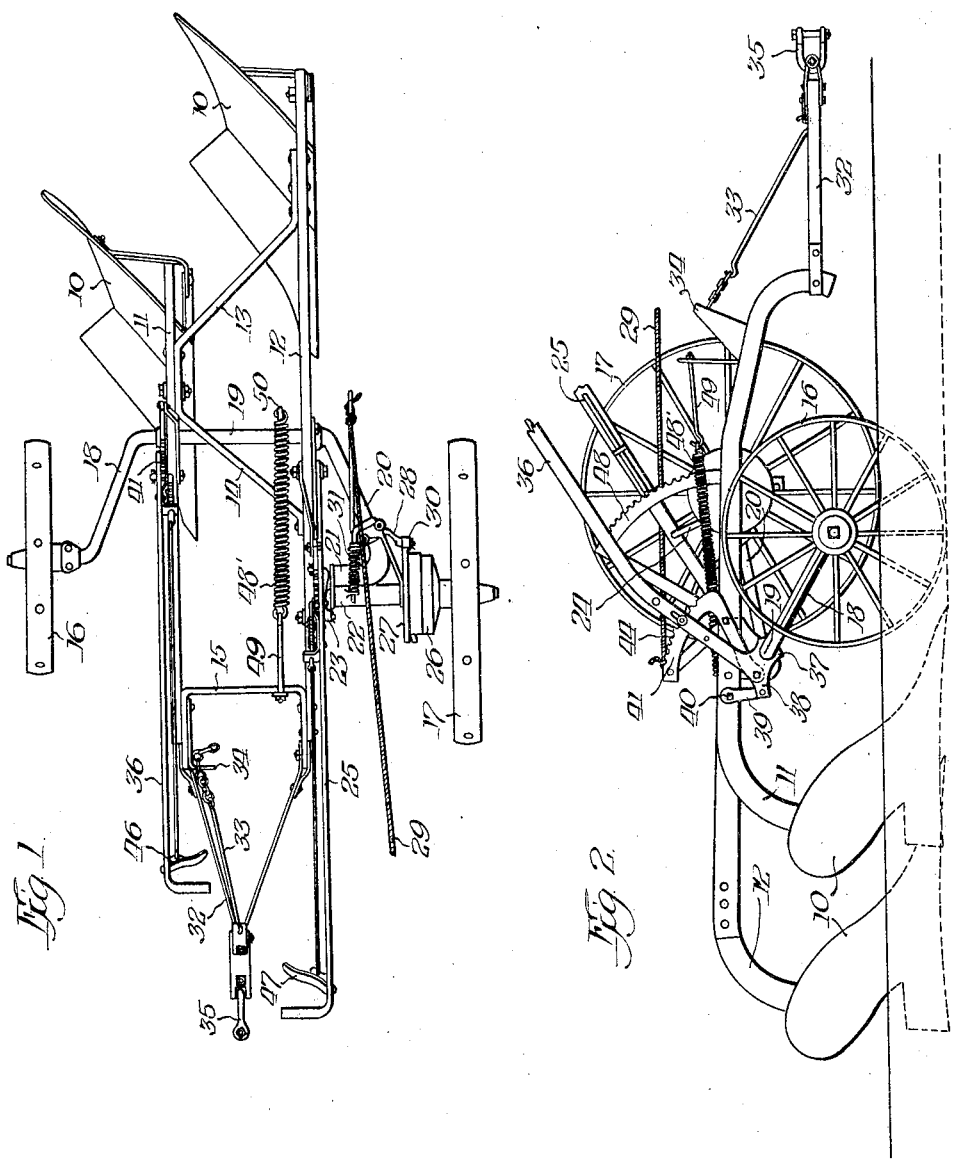

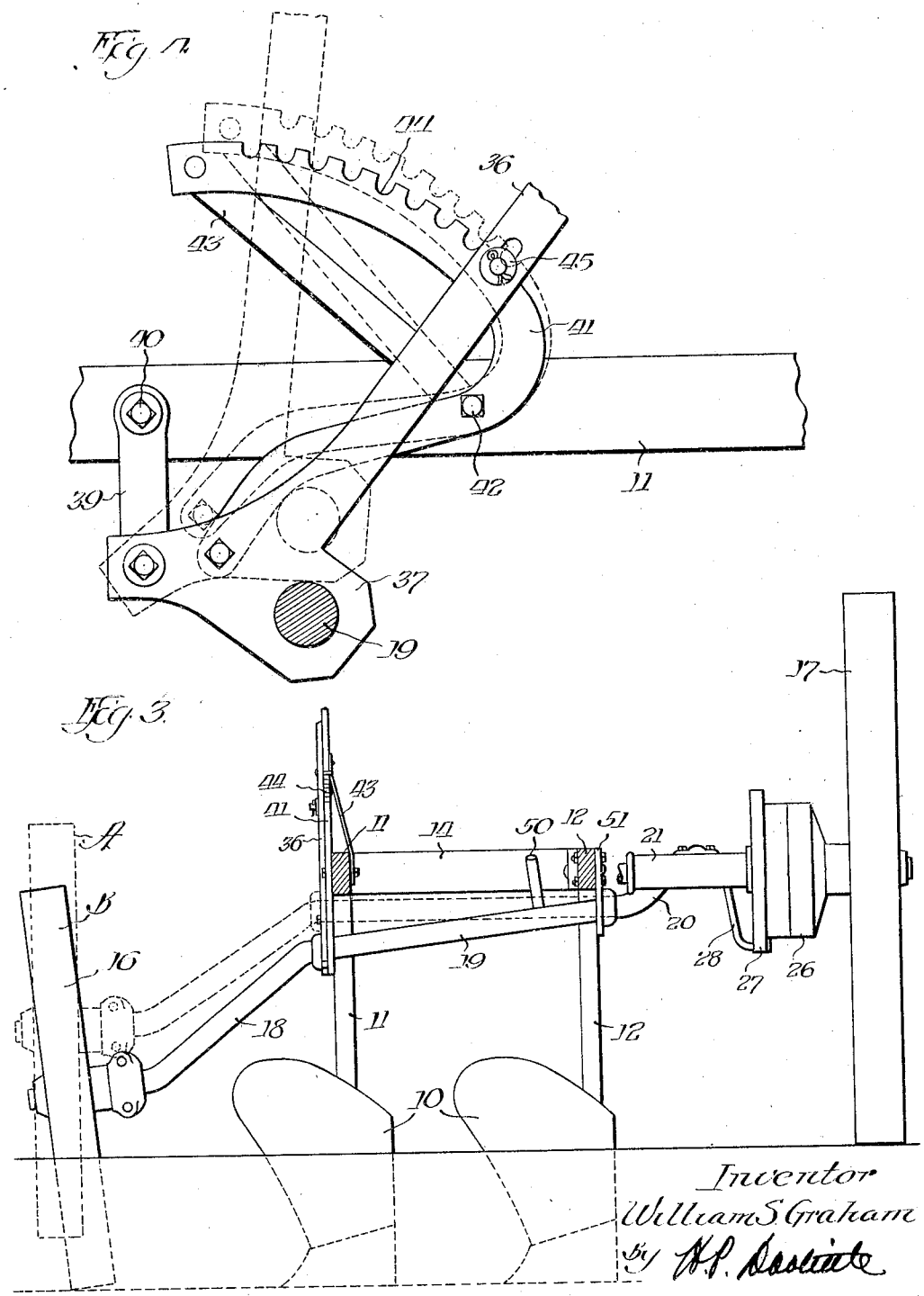

1,737,879

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

FURROW-WHEEL ADJUSTMENT FOR PLOWS

Application filed July 30, 1926. Serial No. 125,896.

This invention relates to improvements in wheel plows and more particularly to an adjusting mechanism for a wheel plow having a unitary crank axle connecting a furrow wheel and a land wheel for supporting the plow.

It is advantageous to construct wheel plows of certain types with a single crank axle journaled transversely of the plow frame for controlling the plows and supporting them in their various positions. However, a plow so constructed requires mechanism for supporting the plow frame in different positions during the plowing operation. For instance, when the first furrows are plowed in a field, both of the supporting wheels operate at substantially the same level, but when the succeeding furrows are plowed, it is necessary for the furrow wheel to run at a lower level as compared to the level upon which it is run during the first trip around the field. In other words, during the second trip around the field and on subsequent trips, the furrow wheel and the land wheel of the plow must operate at different levels in order that the plow bodies shall form the proper furrows.

It is an object of this invention to provide a practical and advantageous mechanism for accomplishing the above indicated results.

It is also an object of the invention to provide mechanism of the above indicated type wherein one portion of the axle is moved vertically relative to the frame in such a manner that its position fore and aft of the frame remains substantially constant.

Referring to the accompanying drawings, wherein the same reference characters indicate like parts mentioned in this specification,—

Figure 1 is a plan view of an illustrative plow embodying the features of this invention;

Figure 2 is an elevation showing the illustrative mechanism for causing relative movement of the crank axle and the plow frame;

Figure 3 is a view transversely of the illustrative plow showing the relative positions of the plow frame, the plow bottoms, and the furrow wheel during different positions in the operation of the plow; and Figure 4 is a plan view upon a large scale showing an illustrative mechanism for accomplishing the results above indicated.

In the drawings, a wheel plow is illustrated comprising the plow bodies 10 secured to plow beams 11 and 12 which are braced by the transverse connections 13, 14 and 15. These connections, together with the plow beams, constitute, in the illustrative structure, the plow frame. Preferably, the transverse connections or braces 13 and 14 constitute different legs of the same member, which affords a rigid connection between the beams at positions closely adjacent to each of the plow bodies so as to maintain the beams rigidly in their proper position relative to each other. The front transverse connection 15 is shown as a U-shaped brace, the legs of which are bolted to the forward ends of the respective plow beams.

The illustrative plow is supported by a furrow wheel 16 and a land wheel 17, which are rotatable upon the ends of a unitary and rigid crank axle 18. This crank axle is located transversely of the plow frame, having an intermediate portion 19 journaled near its ends to each one of the plow beams; at one end this portion is supported by a journal bracket 51 which permits the pivotal movement described below. The land side leg 20 of the crank axle is illustrated as having its end inwardly bent, as shown at 21, and rigidly connected to a casting 22 which affords a central support for the land wheel 17.

The land wheel is mounted upon a rotating crank shaft journaled in the casting 22 and having at its inner end a crank 23 pivotally connected by means of a link 24 to a depth adjusting lever 25 pivotally and adjustably connected to the plow frame.

For the purpose of rotating the crank 23, the land wheel may be clutched thereto by means of a power lift clutch whose parts are indicated at 26 and 27. This form of clutch is well known in the art and is of the type which is set into operation by a trip, such as is shown at 28. The trip 28 is released by a manual pull upon a cord 29, permitting the constantly rotating part 26 of the clutch to be operatively connected to the intermittently rotatable part 27. The part 27 is thereupon rotated through a half revolution until the roller 30 upon the end of the trip arm 28 is moved into an opposite notch in the member 27 under the influence of the spring 31, whereupon the intermittently rotatable part of the power lift clutch is held stationary. During the rotation of the part 27, the crank 23 is rotated through a half revolution to lift or lower the plow bodies.

At the forward end of the plow frame a draft element 32 is pivotally supported by means of a link 33 herein shown as secured to a bracket 34 attached to the plow frame. A clevis 35 is located at the forward end of the draft element 32.

I will now refer to the mechanism for accomplishing the adjustment of the plow frame relative to the furrow wheel, indicated clearly in Figure 3 of the drawings. When the plow is making its first trip across the field to be plowed, the furrow wheel 16 is in the position A indicated in the dotted lines in Figure 3. After the first trip across the field, it is necessary for the wheel 16 to travel in a furrow at a level lower than that at which the land wheel 17 is traveling. To accordingly change the position of the furrow wheel relative to the frame and maintain the level of the frame, it is supported by devices which enable it to be moved to the position B indicated in full lines in Figure 3, the furrow wheel end of the intermediate portion of the crank axle being substantially separated from the plow frame during the latter position of adjustment.

In the illustrative structure, a long, forwardly extending hand lever 36 is formed with a laterally extending portion 37 rotatably receiving the crank axle. The lever 36 has a rear extension 38 so related to the main body of the lever and to the extension 37 as to constitute substantially a bell crank lever. The rear extension 38 is pivotally connected by means of a supporting link 39 depending from the plow frame and shown as pivotally connected to the frame at 40.

A notched sector 41 constitutes a second link pivotally connecting the lever 36 with the plow frame, and the lever is, therefore, floating or bodily movable with respect to the frame. This sector is shown pivoted intermediate its length at 42 to the plow frame and having its lower end pivoted to the bell crank lever 36 at a position intermediate the lower end of the link 39 and the crank axle 19. Connected to the upper end of the sector is a bar 43 which is also pivoted to the frame at 42.

Referring to Figure 4 of the drawings, the dotted lines indicate the position of the parts when the plow is making its first trip around the field, the full lines indicating the positions of the parts when the furrow wheel is lowered relative to the plow frame. The lever 36 is held in any one of the notches 44 of the sector 41 by means of a detent 45 slidably movable relative to the lever.

Again referring to Figure 4 of the drawings, as the lever and its associated parts move from their full line positions to their dotted line positions, the sector has pivotal movement about its fulcrum 42. The lever 36 being carried by the sector must partake of this movement, but as the lever is also pivoted at the lower end of the link 39, the crank axle 19 must partake of the movement of the lever about its pivotal connection with that link. The link 39 may turn about its upper pivot, but, in the position of the parts shown in Figure 4 of the drawings, this link has returned to its original position as the lever moves from the full line position to the dotted line position. It will be noted that the crank axle 19, in its dotted line position, is substantially directly above its full line position, so that its location in a fore and aft direction relative to the plow beam 12 is the same in either position.

The lever 36 is provided with a suitable latch device 46 for releasing the lever from any of the notches 44 in the sector 41. The depth adjusting lever 25 is similarly provided with a latch mechanism 47 cooperating with the segment 48 for holding that lever in any desired position.

For promoting advantageous balancing of the plow and reducing the effort required to lift the plow beams from operative position in the soil, a balancing device herein shown as a coil spring 48' is provided. This spring is connected to the transverse brace 15 by means of a rod 49, at its forward end. The rear end of the spring is preferably connected to the crank arm 50 rigid with the crank axle 19.

Having described my invention, I claim:

1. In a wheel plow, a plow bottom, a plow frame, supporting wheels, a cranked axle connecting said wheels and supporting said frame and plow bottom, said axle having an intermediate portion journaled transversely of the frame, and means for vertically adjusting one side of said frame relative to said axle, said means comprising a lever journaling the axle, a link pivotally connecting the lever and the frame and a sector forming a second link between the lever and the frame and having detent means for holding said lever in a desired position.

2. In a plow construction, a plow bottom, a frame, a furrow wheel, a land wheel, a a rigid crank axle structure journaled upon said frame and rotatively receiving the furrow wheel and the land wheel at its opposite ends, said crank axle structure being connected at one side of the plow frame so that the furrow wheel end of the crank axle may have pivotal movement vertically, and means for connecting the crank axle to the furrow wheel side of the frame so that the furrow wheel may be adjusted vertically without changing the fore and aft relation of the crank axle relative to the plow frame, said latter means including a lever rotatably receiving the crank axle, a link connecting one end of the lever with the frame, and a sector pivoted to the frame intermediate its ends and having its lower end pivoted to the lever intermediate the crank axle and the connection with the first named link.

3. In a wheel plow, plow bottoms, a plow frame rigidly relating said plow bottoms, a furrow wheel, a land wheel, a single crank axle rotatably connected with the frame and rotatably connecting said furrow wheel and said land wheel, and means for vertically adjusting one side of said frame relative to said crank axle, said means comprising a lever journaling the crank axle, a depending link pivotally connected to the frame and to the lever, and a sector pivoted intermediate its ends upon the frame and forming a second link between the lever and the frame, said sector having formations for the purpose of holding the lever in any desired position of adjustment.

4. In a plow construction, a plow bottom, a frame, a furrow wheel, a land wheel, a single rigid crank axle rotatably mounting said wheels at its ends and journaled at its intermediate portion transversely of the frame, a support at the land wheel side of said frame for rotatably and pivotally receiving the crank axle, and adjusting mechanism carried by the furrow wheel side of the frame for vertically moving the frame relative to the furrow wheel, said adjusting mechanism comprising a plurality of links pivotally connected with the frame and depending therefrom, an adjusting lever rotatably receiving the crank axle and pivotally supported by both of said links, and a sector integrally formed with one of said links.

5. In a wheeled plow, the combination of a frame carrying one or more plow bodies, supporting wheels therefor mounted on a rockable crank axle extending transversely of the frame, a bearing secured to the landward side of the frame in which the axle is journaled to rock longitudinally and laterally of the frame, means to turn the axle and move the wheels forwardly or rearwardly to lower or raise the plow, a supporting link pivotally connected to the frame, a movable sector pivoted on the frame, and a floating lever pivotally connected with the link, sector and axle at spaced points on the lever to adjust the frame to parallelism with the ground when the axle is rocked laterally.

6. A wheeled plow comprising a frame carrying one or more plow bodies, land and furrow wheels, cranks on which said wheels are mounted and with which said frame is pivotally connected, whereby said frame may be raised or lowered by fore and aft movement of said wheels, said frame being mounted to rock relatively to said cranks about a longitudinal axis to maintain its transverse parallelism with the ground, a supporting link pivotally connected to the frame, a sector pivotally connected to the frame, and a floating lever journaling the axle upon which the cranks are formed and pivoted at spaced points to the link and sector for rocking the frame relative to said cranks.

7. In a wheeled plow, the combination of a frame carrying one or more plow bodies, a transverse crank axle, said frame being pivotally connected with said axle and being adapted to be rocked relatively thereto about a longitudinal axis to maintain its transverse parallelism with the ground, wheels supporting the end portions of said axle and movable fore and aft to vary the height of said frame from the ground, a floating lever journaling said axle, a movable supporting link connecting the lever and the frame, and a sector movable with the lever and pivoted on the frame.

8. In a plow construction, a plow bottom, a frame, a furrow wheel, a land wheel, a crank axle connecting said wheels and supporting said frame and plow bottom, and means pivotally connecting said axle to said frame for transverse tilting movement, said means including a lever pivoted on the axle adjacent one side of the frame, a plurality of links pivotally connected to the lever and to the side of the frame at longitudinally spaced points on the lever and frame, and means for locking the lever in adjusted position relative to one of the links.

In testimony whereof I affix my signature.

WILLIAM S. GRAHAM.